United States Patent [19]
Tozu et al.

[11] Patent Number: 6,039,411
[45] Date of Patent: Mar. 21, 2000

[54] BRAKE CONTROL SYSTEM FOR A VEHICLE

[75] Inventors: Kenji Tozu, Yokkaichi; Takayuki Itoh, Nagoya; Masanobu Fukami, Hazu gun; Satoshi Yokoyama, Anjo, all of Japan

[73] Assignee: Aisin Seiki Kabushiki Kaisha, Kariya, Japan

[21] Appl. No.: 09/301,338

[22] Filed: Apr. 29, 1999

[30] Foreign Application Priority Data

Apr. 30, 1998 [JP] Japan .................................. 10-137787

[51] Int. Cl.⁷ ...................................................... B60T 8/40
[52] U.S. Cl. .................... 303/116.1; 188/356; 303/113.3; 303/114.3; 303/189; 303/140
[58] Field of Search .............................. 303/113.1, 114.3, 303/113.3, 113.2, 116.1, 116.2, 119.1, 115.3, 189, 139, 146, 900, 901, 140; 188/356, 357, 358, 359

[56] References Cited

U.S. PATENT DOCUMENTS 5,584,540  12/1996  Takeuchi et al. ..................... 303/116.1

FOREIGN PATENT DOCUMENTS

| 2-274649 | 11/1990 | Japan . |
| 5-24533 | 2/1993 | Japan . |
| 7-81540 | 3/1995 | Japan . |
| 8-230634 | 9/1996 | Japan . |

Primary Examiner—Douglas C. Butler
Attorney, Agent, or Firm—Burns, Doane, Swecker & Mathis LLP

[57] ABSTRACT

The present invention is directed to a brake control system, which includes a first pressure circuit and a second pressure circuit for communicating a master cylinder with two sets of wheel cylinders, respectively. In each pressure circuit, a modulator is arranged to modulate the braking pressure in each wheel cylinder, a pressure pump is disposed to supply pressurized brake fluid to each wheel cylinder through each modulator, a normally open first valve is arranged to open or close a first passage for communicating the master cylinder with the modulator, and a normally closed second valve is arranged to open or close a second passage for communicating a reservoir directly with the inlet of each pump, or communicating the reservoir with it through the master cylinder. The pressurized brake fluid is supplied to each pressure circuit including the second valve at the inlet of the pump to perform an auxiliary pressurization. In the case where at least the second valve in the first pressure circuit opens the second passage, and the auxiliary pressurization is performed, the communication between the wheel cylinders in the second pressure circuit is blocked, when the brake pedal is not depressed, and the wheel cylinders in the second pressure circuit is communicated with the master cylinder, when the brake pedal is depressed.

12 Claims, 8 Drawing Sheets

BRAKE CONTROL SYSTEM FOR A VEHICLE

This application claims priority under 35 U.S.C. Sec. 119 to No.10-137787 filed in Japan on Apr. 30, 1998, the entire content of which is herein incorporated by reference.

BACKGROUND OF THE INVENTION

1. Field of the Invention

The present invention relates to a brake control system for a vehicle, which discharges brake fluid in a reservoir to wheel brake cylinders through a modulator by means of a hydraulic pressure pump to perform various braking controls, and especially relates to the brake control system having a function of auxiliary pressurization applied to an input of the pressure pump.

2. Description of the Related Arts

In order to reduce a force for operating a brake pedal when a vehicle is to be braked, various boosters have been employed. Among them, a vacuum booster is popular. It has a constant pressure chamber which is always communicated with an intake manifold of an engine to introduce the negative pressure therefrom, and a variable pressure chamber which is selectively communicated with the atmosphere, or communicated with the constant pressure chamber to introduce the negative pressure therefrom. Also provided is a valve mechanism, which includes a vacuum valve for communicating the constant pressure chamber with the variable pressure chamber, or blocking the communication between them, and an air valve for communicating the variable pressure chamber with the atmosphere, or blocking the communication between them. With the valve mechanism operated in response to depression of the brake pedal, the valve mechanism is actuated to open or close the vacuum valve and/or the air valve, so that a pressure difference between the constant pressure chamber and the variable pressure chamber is produced in response to the force for operating the brake pedal to increase the force, and transmit the increased force to a master cylinder.

With respect to the vacuum booster, Japanese Patent Laid-open Publication No.5-24533 discloses an electrically operated tandem brake boost apparatus, which is adapted to communicate the variable pressure chamber with the atmosphere by means of a solenoid valve, even if the brake pedal is not depressed, whereby a large pressure difference between the variable pressure chamber and the constant pressure chamber is produced to increase the output force, and which is used for automatic braking systems.

Among the automatic braking systems, an automatic pressurization is performed in various braking control systems having braking force control functions, such as a steering control by braking, which is adapted to restrain an excessive oversteer when it is determined that the excessive oversteer occurs during cornering, for example, with a hydraulic braking pressure discharged from a hydraulic pressure pump applied to a wheel cylinder operatively mounted on a front wheel located on the outside of the curve in the vehicle's path, irrespective of operation of the brake pedal. That is, the hydraulic braking pressure is automatically applied to the wheel brake cylinders by the output pressure of the hydraulic pressure pump, irrespective of operation of the brake pedal. When the braking control performed by the automatic pressurization is initiated, the hydraulic pressure pump starts to be driven. Under a condition at a low temperature, brake fluid is hardly flown in a passage, so that it will be difficult to provide a desired pressure increasing gradient. Therefore, it has been desired to supply pressurized brake fluid into an input of the pressure pump thereby to assist the automatic pressurization.

With respect to the braking control performed by the automatic pressurization, it may be appropriate to utilize the vacuum booster. In Japanese Patent Laid-open Publication No.7-81540 for example, it is assumed that whole output of the vacuum booster is used for the auxiliary pressurization. Although it is almost impossible to understand the context of that publication due to its insufficient description, it is presumed that when the auxiliary pressurization is being performed for the braking control by the automatic pressurization with respect to one hydraulic braking pressure circuit, a hold mode is selected for the other hydraulic braking pressure circuit so as not to apply the hydraulic braking pressure to the wheel cylinder.

Basically, when the braking control by the automatic pressurization is being performed with respect to one hydraulic braking pressure circuit, it is necessary to place the other hydraulic braking pressure circuit in such a condition that the hydraulic braking pressure in the wheel brake cylinder can be increased, so that the braking force could be applied to the wheel in the other hydraulic braking pressure circuit, if the brake pedal is depressed. However, in the case where the output of the vacuum booster is large, when the auxiliary pressurization is performed with respect to the one hydraulic braking pressure circuit, large braking force will be applied to the wheel in the other hydraulic braking pressure circuit. This is resulted from the fact that a power source of the vacuum booster is the negative pressure produced in the intake manifold of the engine. Therefore, the large braking force is necessarily applied to the wheel in the other hydraulic braking pressure circuit, when the negative pressure produced in the intake manifold is large. As a result, the wheel is likely locked, on a road with a relatively low coefficient of friction. In the aforementioned Japanese Patent Laid-open Publication No.7-81540, therefore, it is assumed that the hold mode is to be selected for the other hydraulic braking pressure circuit, when the brake pedal is not depressed.

However, it is inappropriate to select the hold mode for the other hydraulic braking pressure circuit, because it will be impossible to apply the braking force in response to an amount depressed by the brake pedal, with respect to the other hydraulic braking pressure circuit, when the brake pedal is depressed. As a countermeasure to this, it is desirable that when the auxiliary pressurization is performed with respect to the one hydraulic braking pressure circuit, the hold mode is to be selected for the other hydraulic braking pressure circuit, and that when the brake pedal is depressed, the pressure increase mode is to be selected.

SUMMARY OF THE INVENTION

Accordingly, it is an object of the present invention to provide a vehicle brake control system discharging brake fluid in a reservoir to wheel brake cylinders through a modulator by means of a hydraulic pressure pump, thereby to perform various braking controls, wherein when a brake pedal is depressed in such a condition that an auxiliary pressurization is being performed for the braking controls made by an automatic pressurization with respect to one hydraulic braking pressure circuit, the hydraulic braking pressure can be properly applied to the other hydraulic braking pressure circuit.

In accomplishing the above and other objects, the vehicle brake control system is arranged to include wheel brake cylinders operatively mounted on front and rear wheels of the vehicle. The wheel brake cylinders are divided into two sets of wheel brake cylinders, each having two wheel brake cylinders. A master cylinder is provided for pressurizing brake fluid in a reservoir to supply the pressurized brake fluid to the wheel brake cylinders in response to depression of a brake pedal. A first hydraulic braking pressure circuit and a second hydraulic braking pressure circuit are arranged to communicate the master cylinder with each of the two sets of wheel brake cylinders, respectively. Two modulators are disposed in the first and second hydraulic braking pressure circuits, respectively. Each modulator is adapted to modulate the braking pressure in each wheel brake cylinder. A pair of hydraulic pressure pumps are disposed in the first and second hydraulic braking pressure circuits, respectively. Each pump is adapted to introduce brake fluid from its inlet and pressurize the brake fluid to supply the pressurized brake fluid to each wheel brake cylinder through each modulator. Two first valves are disposed in the first and second hydraulic braking pressure circuits, respectively. Each first valve is adapted to open or close a first passage for communicating the master cylinder with the modulator, and normally opens the first passage. Two second valves disposed in the first and second hydraulic braking pressure circuits, respectively. Each second valve is adapted to open or close a second passage for communicating the reservoir directly with the inlet of each pump, or communicating the reservoir with the inlet of each pump through the master cylinder, and normally closes the second passage. An auxiliary pressurization device is provided for supplying pressurized brake fluid to each of the first and second hydraulic braking pressure circuits including the second valve at the inlets of the pumps, respectively, to perform an auxiliary pressurization, at least when the second valve opened the second passage. And, a control unit is provided for actuating the modulators, in the case where at least the second valve in the first hydraulic braking pressure circuit opens the second passage, and the auxiliary pressurization device performs the auxiliary pressurization, to block the communication between the wheel brake cylinders in the second hydraulic braking pressure circuit, when the brake pedal is not depressed, and to communicate the wheel brake cylinders in the second hydraulic braking pressure circuit with the master cylinder, when the brake pedal is depressed.

In the brake control system as described above, the control unit is adapted to actuate the modulators in the second hydraulic braking pressure circuit to communicate the wheel brake cylinders in the second hydraulic braking pressure circuit with the master cylinder intermittently, when the brake pedal is depressed, in the case where the auxiliary pressurization device performs the auxiliary pressurization. The control unit may be adapted to set a time period, for which the wheel brake cylinders in the second hydraulic braking pressure circuit are communicated with the master cylinder, in response to an amount operated by the brake pedal.

The brake control system may further comprise a vacuum booster for assisting the operation of the master cylinder, and the auxiliary pressurization device may be adapted to actuate the vacuum booster at least in part thereof irrespective of the operation of the brake pedal, and supply the pressurized brake fluid from the master cylinder into the inlet of each pump to perform the auxiliary pressurization.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 2:
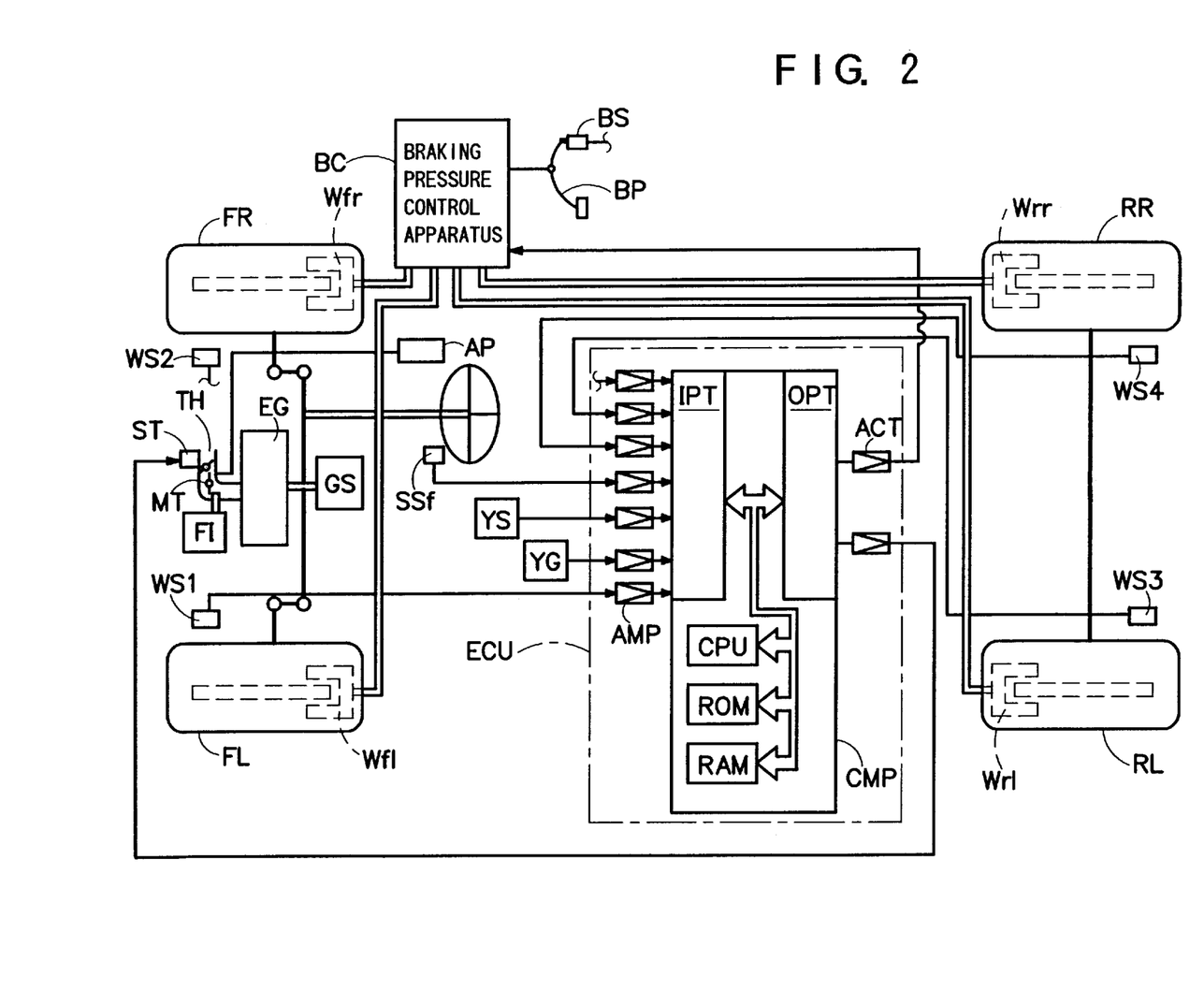
FIG. 2 is a schematic block diagram of a vehicle having a brake control system according to an embodiment of the present invention.

Referring to FIG. 2, there is schematically illustrated a vehicle having a brake control system according to the present invention. The vehicle has an engine EG provided with a fuel injection apparatus FI and a throttle control apparatus TH which is arranged to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the front wheels FL, FR through a transmission GS to provide a front-drive system, but the present embodiment is not limited to the front-drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 1:
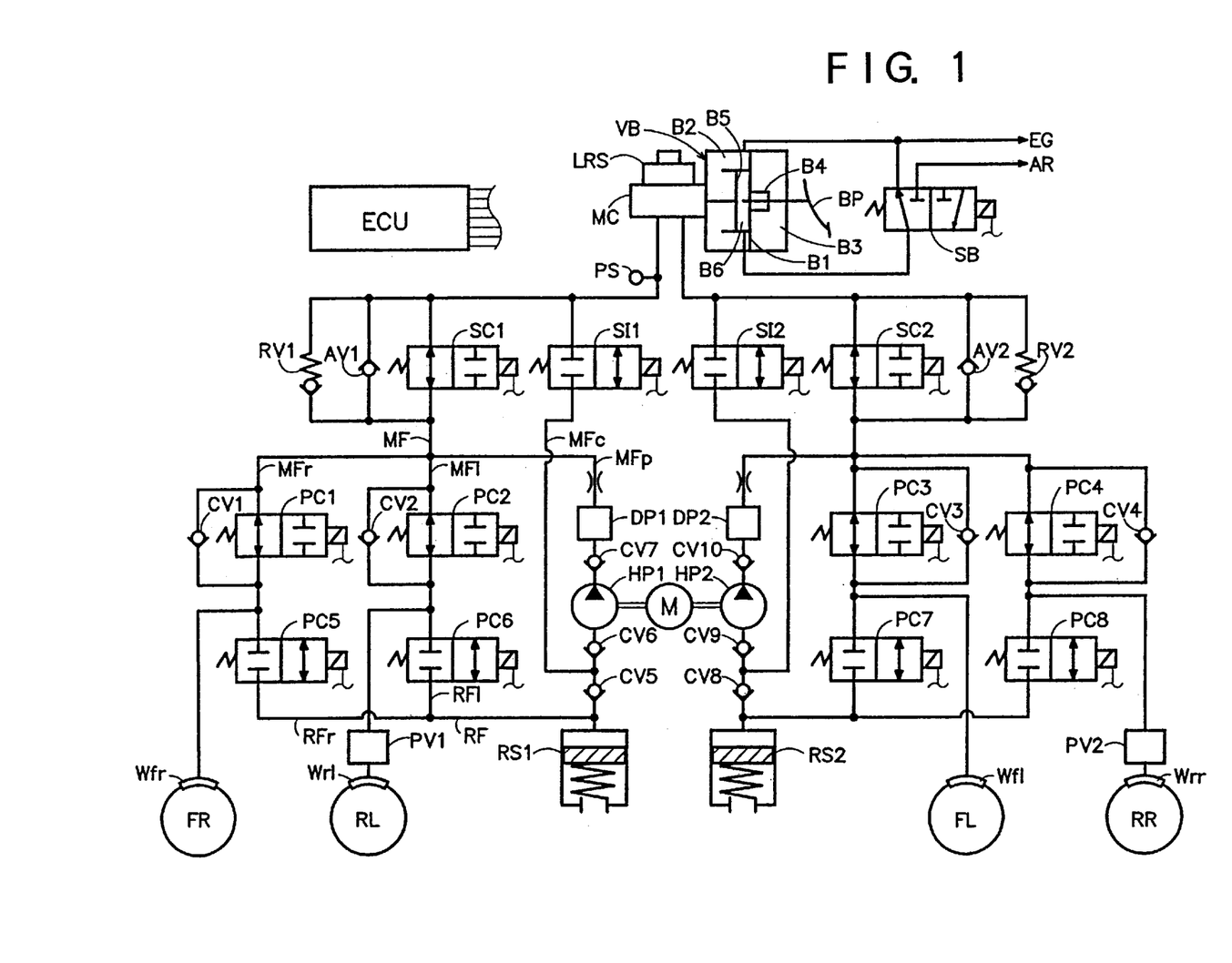
FIG. 1 is a block diagram illustrating an embodiment of a brake control system according to an embodiment of the present invention.

With respect to a braking system according to the present embodiment, wheel brake cylinders Wfl, Wfr, Wrl, Wrr are operatively mounted on the wheels FL, FR, RL, RR of the vehicle, respectively, and which is fluidly connected to a hydraulic braking pressure control apparatus BC. The pressure control apparatus BC in the present embodiment may be arranged as illustrated in FIG. 1 which will be explained later in detail. According to the present embodiment, a so-called diagonal circuit system has been employed.

As shown in FIG. 2, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or an actual yaw rate γ is detected and fed to the electronic controller ECU. The actual yaw rate γ may be calculated on the basis of a wheel speed difference Vrd between the wheel speeds of non-driven wheels (wheel speeds Vwrl, Vwrr of the rear wheels RL, RR in the present embodiment), i.e., Vrd=Vwrr−Vwrl, so that the yaw rate sensor YS may be omitted.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts as shown in FIGS. 3 to 6, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

FIG. 1 shows the hydraulic braking pressure control apparatus BC according to the present embodiment, which includes a master cylinder MC and a vacuum booster VB which are activated in response to depression of the brake pedal BP. The master cylinder MC is boosted by the vacuum booster VB to pressurize the brake fluid in a low-pressure reservoir LRS and discharge the master cylinder pressure to two hydraulic braking pressure circuits for the wheels FR, RL and the wheels FL, RR, respectively. The master cylinder MC is of a tandem type having two pressure chambers communicated with the two hydraulic braking pressure circuits, respectively. That is, a first pressure chamber is communicated with the hydraulic braking pressure circuit for the wheels FR, RL, and a second pressure chamber is communicated with the hydraulic braking pressure circuit for the wheels FL, RR. At the output side of the master cylinder MC, a pressure sensor PS is provided for detecting its output, i.e., master cylinder pressure.

The vacuum booster VB according to the present embodiment is substantially the same as the prior vacuum booster, so that it has a constant pressure chamber B2 and a variable pressure chamber B3 separated by a movable wall B1. On the movable wall B1 is operatively mounted a valve mechanism B4, which includes a vacuum valve (not shown) for communicating the constant pressure chamber B2 with the variable pressure chamber B3, or blocking the communication between them, and an air valve (not shown) for communicating the variable pressure chamber B3 with the atmosphere, or blocking the communication between them. The constant pressure chamber B2 is always communicated with an intake manifold (not shown) of the engine EG to introduce the negative pressure into the chamber B2. The variable pressure chamber B3 is selectively communicated with the atmosphere, or communicated with the constant pressure chamber B2 to introduce the negative pressure into the chamber B3, by means of the valve mechanism B4. In response to depression of the brake pedal BP, therefore, the vacuum valve and air valve of the valve mechanism B4 are actuated to produce a pressure difference between the constant pressure chamber B2 and the variable pressure chamber B3. As a result, the output force increased in response to depression of the brake pedal BP is transmitted to the master cylinder MC.

In the constant pressure chamber B2 of the vacuum booster VB according to the present embodiment, an auxiliary movable wall B5 is disposed to define an auxiliary variable pressure chamber B6 between the movable wall B1 and the auxiliary movable wall B5. The auxiliary movable wall B5 can be moved toward the master cylinder MC in accordance with the movement of the brake pedal BP, and also it can be moved toward the master cylinder MC irrespective of the brake pedal BP to actuate the master cylinder MC. That is, the auxiliary variable pressure chamber B6 is selectively communicated with the atmosphere, or communicated with the intake manifold of the engine EG to introduce the negative pressure, in accordance with a position of a booster changeover valve SB. The booster changeover valve SB is a three-port two-position solenoid operated valve. When the booster changeover valve SB is turned off to be placed in its first position (normal condition), the auxiliary variable pressure chamber B6 is communicated with the intake manifold of the engine EG, together with the constant pressure chamber B2. When the valve SB is turned on to be placed in its second position, it is changed over to such a condition that the auxiliary variable pressure chamber B6 is communicated with the atmosphere (designated by "AR" in FIG. 1).

Accordingly, when the negative pressure is applied to the auxiliary variable pressure chamber B6 through the booster changeover valve SB, the auxiliary movable wall B5 is held to be apart from the movable wall B1 by a constant distance, and moved toward the master cylinder MC in accordance with the forward movement of the brake pedal BP. When the auxiliary variable pressure chamber B6 is communicated with the atmosphere, the pressure difference is produced between the chamber B6 and the constant pressure chamber B2 under the negative pressure. Consequently, the master cylinder MC is actuated in response to movement of the auxiliary movable wall B5, irrespective of the operation of the brake pedal BP (even if the brake pedal BP is not depressed).

In the hydraulic braking pressure circuit for the wheels FR, RL, the first pressure chamber is communicated with wheel brake cylinders Wfr, Wrl respectively, through a main passage MF and its branch passages MFr, MFl. A normally open first solenoid valve SC1 (hereinafter, simply referred to a solenoid valve SC1) is disposed in the main passage MF, to act as a so-called cut-off valve. Also, the first pressure chamber is communicated through an auxiliary passage MFc with check valves CV5, CV6, which will be described later. A normally closed second solenoid valve SI1 (hereinafter, simply referred to a solenoid valve SI1) is disposed in the auxiliary passage MFc. Each of the solenoid valves SC1, SI1 is formed by a two-port two-position solenoid operated valve. And, normally open two-port two-position solenoid operated switching valves PC1, PC2 (hereinafter, simply referred to as solenoid valves PC1, PC2) are disposed in the branch passages MFr, MF1, respectively, and in parallel therewith check valves CV1, CV2, respectively.

The check valves CV1, CV2 are provided for allowing the flow of the brake fluid toward the master cylinder MC and preventing the flow toward the wheel brake cylinders Wfr, Wr1. The brake fluid in the wheel brake cylinders Wfr, Wr1 is returned to the master cylinder MC, and then to the low-pressure reservoir LRS through the check valves CV1, CV2 and the solenoid valve SC1 placed in its open position as shown in FIG. 1. Accordingly, if the brake pedal BP is released, the hydraulic braking pressure in the wheel brake cylinders Wfr, Wr1 is rapidly reduced to the pressure lower than the pressure at the master cylinder MC. And, normally closed two-port two-position solenoid operated switching valves PC5, PC6 (hereinafter, simply referred to as solenoid valves PC5, PC6) are disposed in the branch passages RFr, RF1, respectively, which merge into the drain passage RF connected to the reservoir RS1.

In the hydraulic braking pressure circuit for the wheels FR, RL, the solenoid valves PC1, PC2, PC5, PC6 form the modulator of the present invention. A hydraulic pressure pump HP1 is disposed in a passage MFp connected to the branch passages MFr, MF1 at the upstream of the solenoid valves PC1, PC2, and an outlet of the pressure pump HP1 is connected to the solenoid valves PC1, PC2 through a check valve CV7 and a damper DP1. The pressure pump HP1 and a pressure pump HP2 are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and spring to function as an accumulator for storing a necessary volume of the brake fluid for various controls as described later.

The master cylinder MC is connected to a position between the check valves CV5 and CV6 disposed at the inlet side of the pressure pump HP1 through the passage MF. The check valve CV5 is provided for preventing the flow of the brake fluid toward the reservoir RS1 and allowing the reverse flow. The check valves CV6, CV7 are provided for restricting the flow of the brake fluid discharged from the pressure pump HP1 to a predetermined direction, and normally formed within the pressure pump HP1 in a body. Accordingly, the solenoid valve SI1 is normally placed in the closed position as shown in FIG. 1 where the communication between the master cylinder MC and the inlet of the pressure pump HP1 is blocked, and switched to the open position where the master cylinder MC is communicated with the inlet of the pressure pump HP1.

In parallel with the solenoid valve SC1, is disposed a relief valve RV1 which prevents the brake fluid in the master cylinder MC from flowing toward the solenoid valves PC1, PC2, and allows the brake fluid to flow toward the master cylinder MC when the braking pressure at the solenoid valves PC1, PC2 is greater than the braking pressure at the master cylinder MC by a predetermined pressure difference, and a check valve AV1 which allows the flow of the brake fluid toward the wheel brake cylinders Wfr, Wr1, and prevents its reverse flow. The relief valve RV1 is provided for returning the brake fluid to the low-pressure reservoir LRS through the master cylinder MC when the pressurized braking pressure discharged from the pressure pump HP1 is greater than the braking pressure discharged from the master cylinder MC by the predetermined pressure difference, thereby to modulate the brake fluid discharged from the pressure pump HP1 into a predetermined pressure. The damper DP1 is disposed at the outlet side of the pressure pump HP1, and a proportioning valve PV1 is disposed in a passage connected to the rear wheel brake cylinder Wr1.

In the hydraulic braking pressure circuit for the wheels FL, RR, are disposed a reservoir RS2, damper DP2, proportioning valve PV2, normally open two-port two-position solenoid operated switching valve SC2 (first switching valve), normally closed two-port two-position solenoid operated switching valve SI2 (second switching valve), PC7, PC8, normally open two-port two-position solenoid operated switching valves PC3, PC4, check valves CV3, CV4, CV8–CV10, relief valve RV2, and check valve AV2. The pressure pump HP2 is driven by the electric motor M together with the pressure pump HP1. Both of the pumps HP1 and HP2 will be driven continuously after the motor M starts to operate them. In the flowcharts as described later, the solenoid valves and etc. are indicated by (*), when they represent those used in both of the two hydraulic braking pressure circuits.

In operation, every valves are placed in their normal positions and the motor M is stopped as shown in FIG. 1, during the normal braking operation. When the brake pedal BP is depressed, with the valves in the conditions as shown in FIG. 1, the master cylinder MC is actuated to discharge the master cylinder pressure from the first and second pressure chambers to the hydraulic braking pressure circuit for the wheels FR, RL, and the hydraulic braking pressure circuit for the wheels FL, RR, respectively, and supply the pressure into the wheel brake cylinders Wfr, Wr1, Wf1, Wrr, through the solenoid valves SC1, SC2 and the solenoid valves PC1–PC8. Since the hydraulic braking pressure circuits for the wheels FR, RL and wheels FL, RR are substantially the same, only the hydraulic braking pressure circuit for the wheels FR, RL will be explained hereinafter.

During the braking operation, when the wheel FR tends to be locked for example, and the anti-skid control is initiated, the solenoid valve PC1 is changed to its closed position, and the solenoid valve PC5 is placed in its open position, while the solenoid valve SC1 is placed in its open position. As a result, the brake fluid in the wheel brake cylinder Wfr is drained into the reservoir RS1 through the solenoid valve PC5 to reduce the pressure in the wheel brake cylinder Wfr. When a pulse pressure increase mode is selected for the wheel brake cylinder Wfr, the solenoid valve PC5 is placed in its closed position and the solenoid valve PC1 is placed in its open position, so that the master cylinder pressure is supplied from the master cylinder MC to the wheel brake cylinder Wfr through the solenoid valve PC1 in its open position. Then, the solenoid valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the solenoid valve PC5 is placed in the closed position, and then the solenoid valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1 and the solenoid valve SC1 in its open position, and consequently to the low pressure reservoir LRS. Thus, an independent braking force control is performed with respect to each wheel.

When the traction control is initiated to start an anti-slip control operation for the wheel FR under the accelerating operation, for example, the solenoid valve SC1 is changed to its closed position, and the solenoid valve SI1 is changed to its open position, and also the solenoid valve PC2 connected to the wheel brake cylinder Wr1 is placed in its closed position, and the solenoid valve PC1 is placed in its open position. Also, the booster changeover valve SB is placed in its second position, so that the auxiliary variable pressure chamber B6 is communicated with the atmosphere, and the auxiliary movable wall B5 is moved irrespective of operation of the brake pedal BP, thereby to servo the operation of the master cylinder MC. Therefore, the inlet side of the pump HP1 is filled with the pressurized brake fluid. That is, the brake fluid is suctioned from the low pressure reservoir LRS through the master cylinder MC in its inoperative condition and the solenoid valve SI1 in its open position, the inlet side of the pump HP1 is pressurized by the vacuum booster VB. In this condition, if the pressure pump HP1 is driven by the motor M, the pressurized brake fluid is immediately supplied to the wheel brake cylinder Wfr (of the driven wheel) through the solenoid valve PC1. Then, if the solenoid valve PC1 is placed in its closed position, the pressure in the wheel brake cylinder Wfr is held. Accordingly, even if the brake pedal BP is not depressed, when the acceleration slip control is performed with respect to the wheel FR, for example, the auxiliary pressurization is performed by the solenoid valves PC1, PC5 are energized and de-energized alternately in response to the acceleration slip of the wheel FR to provide a pressure control mode out of the pulse pressure increase, pulse pressure decrease and hold modes for the wheel brake cylinder Wfr. Whereby, the braking force is applied to the wheel FR to limit its rotating force, so that the accelerating slip is effectively prevented to perform the traction control properly.

Furthermore, when the excessive oversteer, for example, is needed to be prevented in case of the steering control by braking, the moment for overcoming the excessive oversteer must be created. In this case, it is effective to apply the braking force only to a certain single wheel. That is, with respect to the hydraulic braking pressure circuit for the wheels FR, RL, the solenoid valve SC1 is placed in its closed position, and the solenoid valve SI1 is placed in its open position, and the motor M is driven, so that the pressure pump HP1 is actuated to discharge the pressurized brake fluid therefrom. Then, with the solenoid valves PC1, PC2, PC5, PC6 energized and de-energized alternately, the hydraulic pressure in each of the wheel braking cylinders Wfr, Wr1 is gradually increased, decreased or held. Consequently, the braking force distribution between the front and rear wheels is controlled to keep the course trace performance of the vehicle. In this condition, the auxiliary pressurization is performed by the vacuum booster VB, so that the inlet side of the pump HP1 is pressurized immediately, thereby to perform the hydraulic pressure control smoothly. Under this condition, if the pressure pump HP1 is driven by the motor M, the pressurized brake fluid is immediately supplied to the wheel brake cylinder Wfr (of the driven wheel) through the solenoid valve PC1.

The solenoid valves SC1, SC2, SI1, SI2 and solenoid valves PC1–PC8 are controlled by the electronic controller ECU to perform the steering control by braking, and etc. For example, when it is determined that the excessive oversteer occurs during cornering, the braking force will be applied to a front wheel located on the outside of the curve in the vehicle's path for example, to produce a moment for forcing the vehicle to turn in the direction toward the outside of the curve, i.e., an outwardly oriented moment, in accordance with an oversteer restraining control which may be called as a vehicle stability control. When it is determined that the excessive understeer occurs while a vehicle is undergoing a cornering maneuver, for example, the braking force will be applied to force the vehicle to turn in the direction toward the inside of the curve, i.e., an inwardly oriented moment, in accordance with an understeer restraining control, which may be called as a course trace performance control. The above described oversteer restraining control and understeer restraining control as a whole may be called as the steering control by braking.

Figure 3:
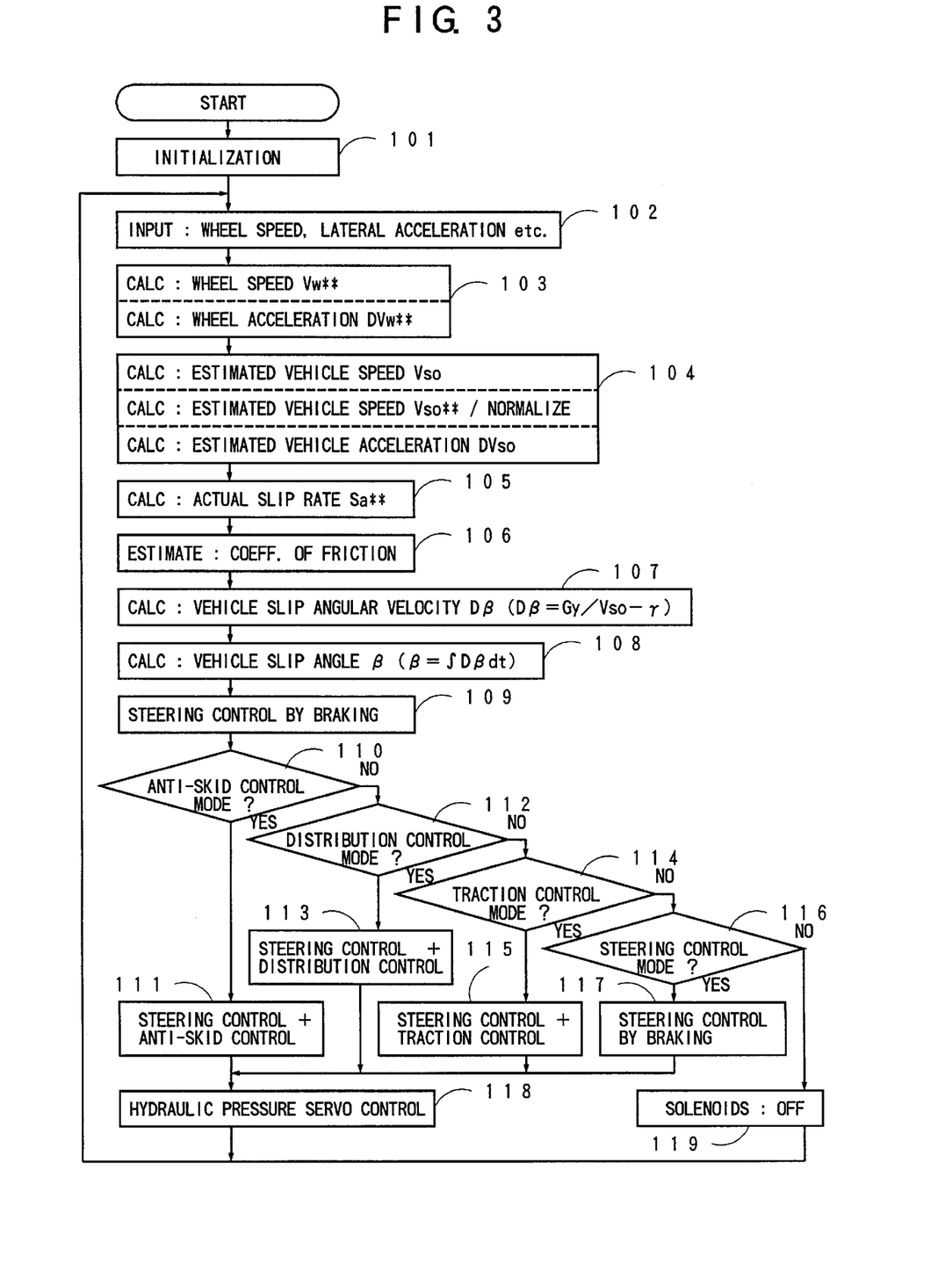
FIG. 3 is a flowchart showing a main routine of the brake control according to an embodiment of the present invention.

According to the present embodiment as constituted above, a program routine for the vehicle motion control including the steering control by braking, anti-skid control and so on is executed by the electronic controller ECU, as will be described hereinafter with reference to FIGS. 3 to 6. The program routine starts when an ignition switch (not shown) is turned on. At the outset, the program for the brake control as shown in FIG. 3 provides for initialization of the system at Step 101 to clear various data. At Step 102, the signals detected by the wheel speed sensors WS1 to WS4 are read by the electronic controller ECU, and also read are the signal (steering angle δf) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. At Step 104, the maximum of the wheel speeds Vw for four wheels is calculated to provide an estimated vehicle speed Vso on a gravity center of the vehicle (Vso=MAX[Vw]), and an estimated vehicle speed Vso is calculated for each wheel, respectively, on the basis of the wheel speed Vw. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration DVso. At Step 105, also calculated is an actual slip rate Sa on the basis of the wheel speed Vw for each wheel and the estimated vehicle speed Vso** (or, the estimated and normalized vehicle speed) which are calculated at Steps 103 and 104, respectively, in accordance with the following equation:

$$Sa^{} = (Vso^{} - Vw^{})/Vso^{}$$

Then, at Step 106, on the basis of the vehicle acceleration DVso and the actual lateral acceleration Gya detected by the lateral acceleration sensor YG, the coefficient of friction $\mu$ against a road surface can be calculated in accordance with the following equation:

$$\mu \doteq (DVso^2 + Gya^2)^{1/2}$$

In order to detect the coefficient of friction against the road surface, various methods may be employed other than the above method, such as a sensor for directly detecting the coefficient of friction against the road surface.

The program proceeds to Step 107, a vehicle slip angular velocity Dβ is calculated, and a vehicle slip angle β is calculated at Step 108. This vehicle slip angle β is an angle which corresponds to a vehicle slip against the vehicle's path of travel, and which can be estimated as follows. That is, at the outset, the vehicle slip angular velocity Dβ, which is a differentiated value dβ/dt of the vehicle slip angle β, is calculated at Step 107 in accordance with the following equation:

$$D\beta = Gy/Vso - \gamma$$

Then, the vehicle slip angle β is calculated at Step 108 in accordance with the following equation:

$$\beta = \int (Gy/Vso - \gamma) dt$$

where "Gy" is the lateral acceleration of the vehicle, "Vso" is the estimated vehicle speed of the vehicle measured at its gravity center, and "γ" is the yaw rate. The vehicle slip angle β may be calculated in accordance with the following equation:

$$\beta = \tan^{-1}(Vy/Vx)$$

where "Vx" is a longitudinal vehicle speed and "Vy" is a lateral vehicle speed.

Then, the program proceeds to Step 109 where the mode for the steering control by braking is made to provide a desired slip rate for use in the steering control by braking, wherein the braking force applied to each wheel is controlled at Step 117 through the hydraulic pressure servo control which will be explained later. The steering control by braking is to be added to each control performed in all the control modes described later. Then, the program proceeds to Step 110, where it is determined whether the condition for initiating the anti-skid control is fulfilled or not. If it is determined that the condition is in the anti-skid control mode, the program proceeds to Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 102. If it is determined at Step 116 that the condition for initiating the steering control by braking has not been fulfilled, the program proceeds to Step 119 where solenoids for all of the solenoid valves are turned off, and then the program returns to Step 102. In accordance with the control modes set at Steps 111, 113, 115 and 117, the sub-throttle opening angle for the throttle control apparatus TH may be adjusted in response to the condition of the vehicle in motion, so that the output of the engine EG could be reduced to limit the driving force produced thereby.

Figure 4:
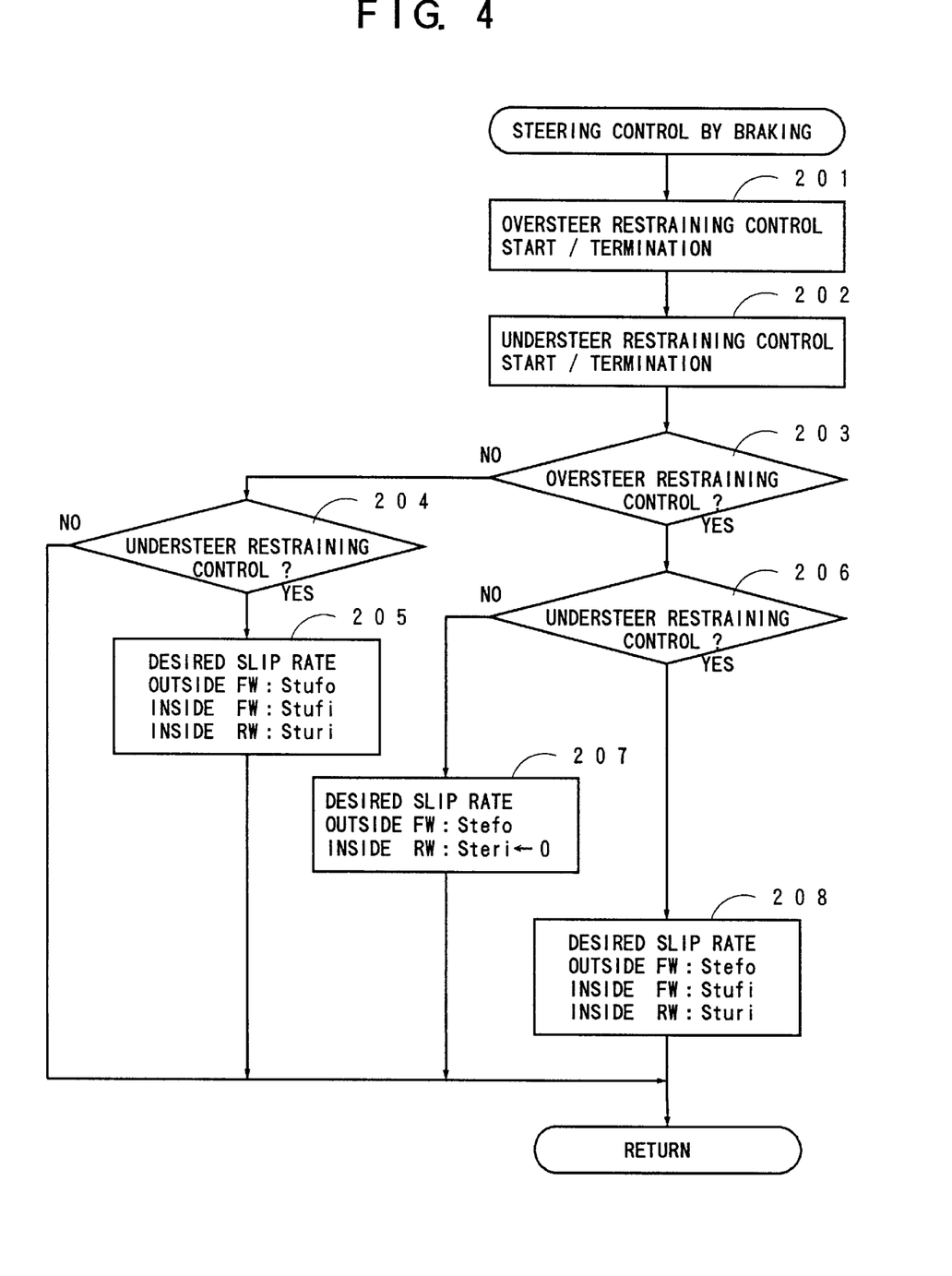
FIG. 4 is a flowchart showing a subroutine for setting a desired slip rate for use in a steering control by braking according to an embodiment of the present invention.
Figure 7:
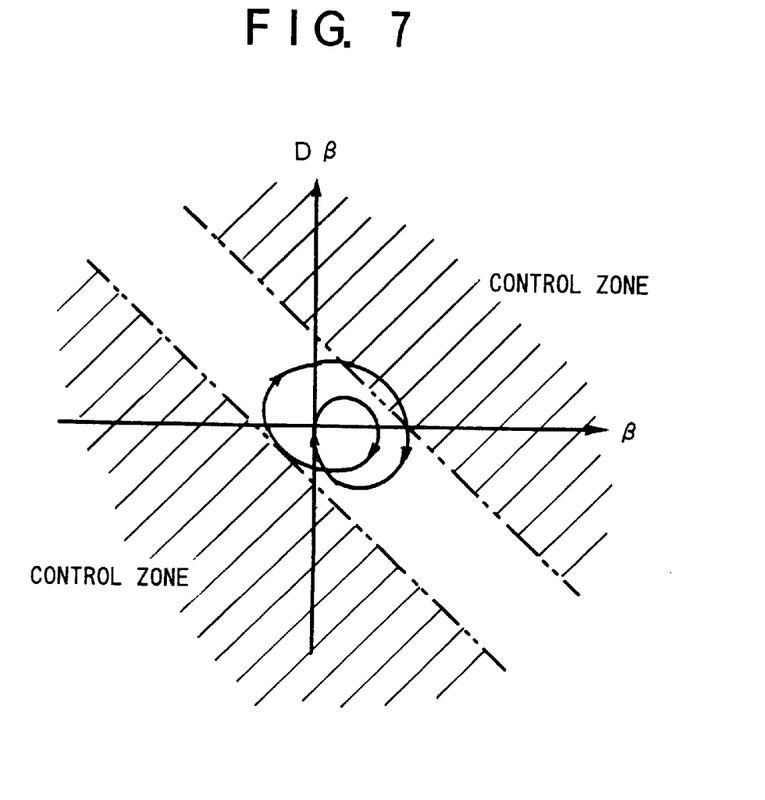
FIG. 7 is a diagram showing a region for determining start and termination of the oversteer restraining control according to an embodiment of the present invention.

FIG. 4 shows a flowchart for setting desired slip rates which are to be provided at Step 109 in FIG. 3 for the operation of the steering control by braking, which includes the oversteer restraining control and the understeer restraining control. Through this flowchart, therefore, the desired slip rates are set in accordance with the oversteer restraining control and/or the understeer restraining control. At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β–Dβ plane as shown in FIG. 7. That is, if the vehicle slip angle β and the vehicle slip angular velocity Dβ which are calculated when determining the start or termination, are fallen within the control zone, the oversteer restraining control will be started. However, if the vehicle slip angle β and the vehicle slip angular velocity Dβ come to be out of the control zone, the oversteer restraining control will be controlled as indicated by the arrow in FIG. 7 thereby to be terminated. Therefore, the boundary between the control zone and non-control zone (as indicted by two dotted chain line in FIG. 7) corresponds to the boundary of a starting zone. And, the braking force applied to each wheel is controlled in such a manner that the farther they remote from the boundary between the control zone and non-control zone (two dotted chain line in FIG. 7) toward the control zone, the more the amount to be controlled will be provided.

Figure 8:
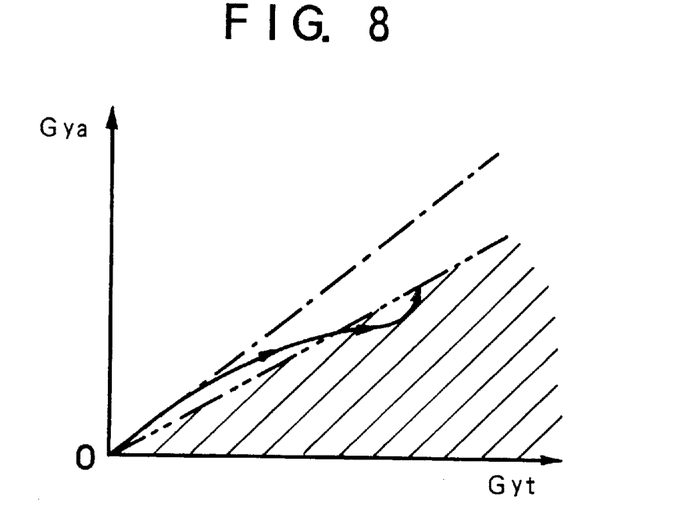
FIG. 8 is a diagram showing a region for determining start and termination of the understeer restraining control according to an embodiment of the present invention.

On the other hand, the determination of the start and termination is made at Step 202 on the basis of the determination whether it is within a control zone indicated by hatching in FIG. 8. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 8 thereby to be terminated.

Then, the program proceeds to Step 203, where it is determined whether the oversteer restraining control is to be performed or not. If the oversteer restraining control is not to be performed, the program further proceeds to Step 204 where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not. In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

With respect to the desired slip rate for use in the oversteer restraining control set at Step 207, the vehicle slip angle $\beta$ and the vehicle slip angular velocity $D\beta$ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt = \gamma(\theta f) \cdot Vso;$$

$$\gamma(\theta f) = \{\theta f/(N \cdot L)\} \cdot Vso/(1 + Kh \cdot Vso^2)$$

where "Kh" is a stability factor, "N" is a steering gear ratio, and "L" is a wheelbase of the vehicle.

At Step 205, the desired slip rate of a front wheel located on the outside of the curve of the vehicle's path is set as "Stufo", the desired slip rate of a front wheel located on the inside of the curve is set as "Stufi", and the desired slip rate of a rear wheel located on the inside of the curve is set as "Sturi". As for the slip rate, "t" indicates a desired value, which is comparable with a measured actual value indicated by "a". Then, "u" indicates the understeer restraining control, "f" indicates the front wheel, "r" indicates the rear wheel, "o" indicates the outside of the curve, and "i" indicates the inside of the curve, respectively.

At Step 207, the desired slip rate of the front wheel located on the outside of the curve is set as "Stefo", and the desired slip rate of the rear wheel located on the inside of the curve is set as "Steri", wherein "e" indicates the oversteer restraining control. Whereas, at Step 208, the desired slip rate of the front wheel located on the outside of the curve is set as "Stefo", the desired slip rate of the front wheel located on the inside of the curve is set as "Stufi", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a rear wheel located on the outside of the curve, i.e., a non-driven wheel of the front drive vehicle is not to be controlled, because this wheel is employed as a reference wheel for use in calculation of the estimated vehicle speed.

The desired slip rates Stefo for use in the oversteer restraining control is calculated in accordance with the following equation:

$$Stefo = K1 \cdot \beta + K2 \cdot D\beta$$

where K1, K2 are constants which are set so as to provide the desired slip rate Stefo which is used for increasing the braking pressure (i.e., increasing the braking force). However, the desired slip rate Steri of the rear wheel located on the inside of the curve is set to be zero.

On the contrary, the desired slip rates Stufo, Sturi for use in the understeer restraining control are calculated in accordance with the following equations, respectively:

$$Stufo = K3 \cdot \Delta Gy$$

$$Sturi = K4 \cdot \Delta Gy$$

where K3 is a constant for providing the desired slip rate Stufo which is used for increasing the braking pressure (or, alternatively decreasing the braking pressure), while K4 is a constant for providing the desired slip rate which is used for increasing the braking pressure.

Figure 5:
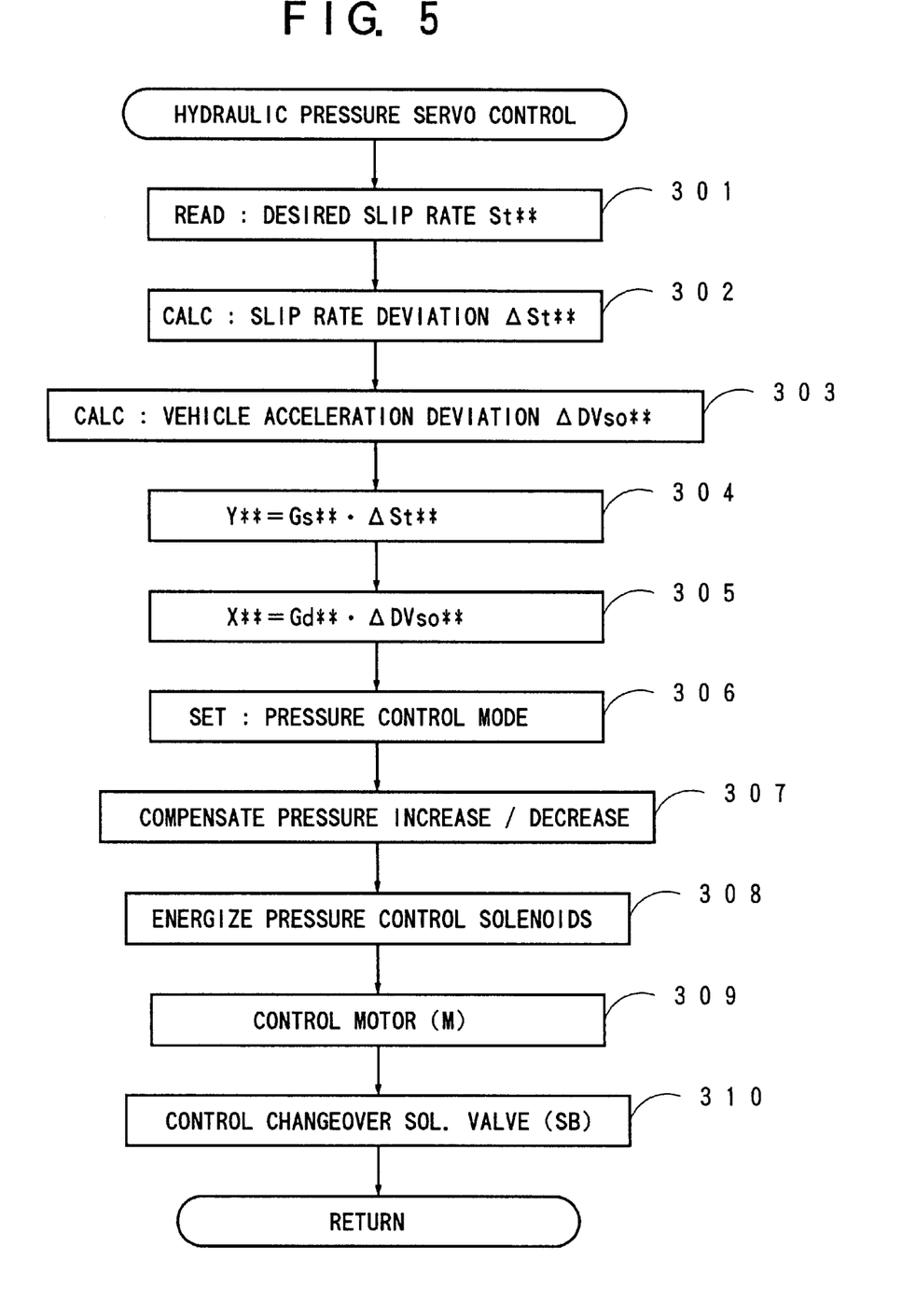
FIG. 5 is a flowchart showing a hydraulic pressure servo control according to an embodiment of the present invention.

FIG. 5 shows the hydraulic pressure servo control which is executed at Step 118 in FIG. 3, and wherein the wheel cylinder pressure for each wheel is controlled through the slip rate servo control. At Step 301, the desired slip rates St, which are set at Step 205, 207 or 208, are read to provide the desired slip rate for each wheel of the vehicle. Then, the program proceeds to Step 302 where a slip rate deviation $\Delta St^{}$ is calculated for each wheel, and further proceeds to Step 303 where a vehicle acceleration deviation $\Delta DVso^{}$ is calculated. At Step 302, the difference between the desired slip rate St and the actual slip rate Sa is calculated to provide the slip rate deviation $\Delta St^{}$ (i.e., $\Delta St^{} = St^{} - Sa^{}$). And, at Step 303, the difference between the estimated vehicle acceleration DVso on the center of gravity of the vehicle and the vehicle acceleration DVw of a selected wheel is calculated to provide the vehicle acceleration deviation $\Delta DVso^{}$. The actual slip rate Sa and the vehicle acceleration deviation $\Delta DVso^{**}$ may be calculated in accordance with a specific manner which is determined in dependence upon the control modes such as the anti-skid control mode, traction control mode or the like, the explanation of which will be omitted.

Figure 9:
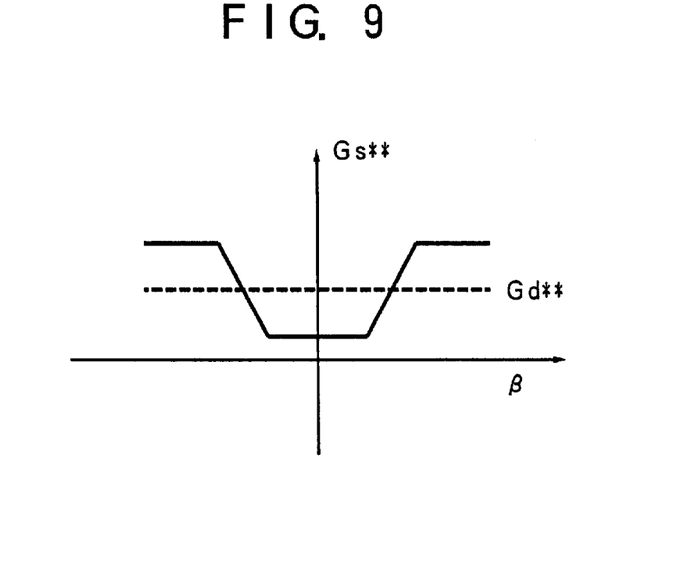
FIG. 9 is a diagram showing a relationship between a vehicle slip angle and a gain for calculating the parameters according to an embodiment of the present invention.
Figure 10:
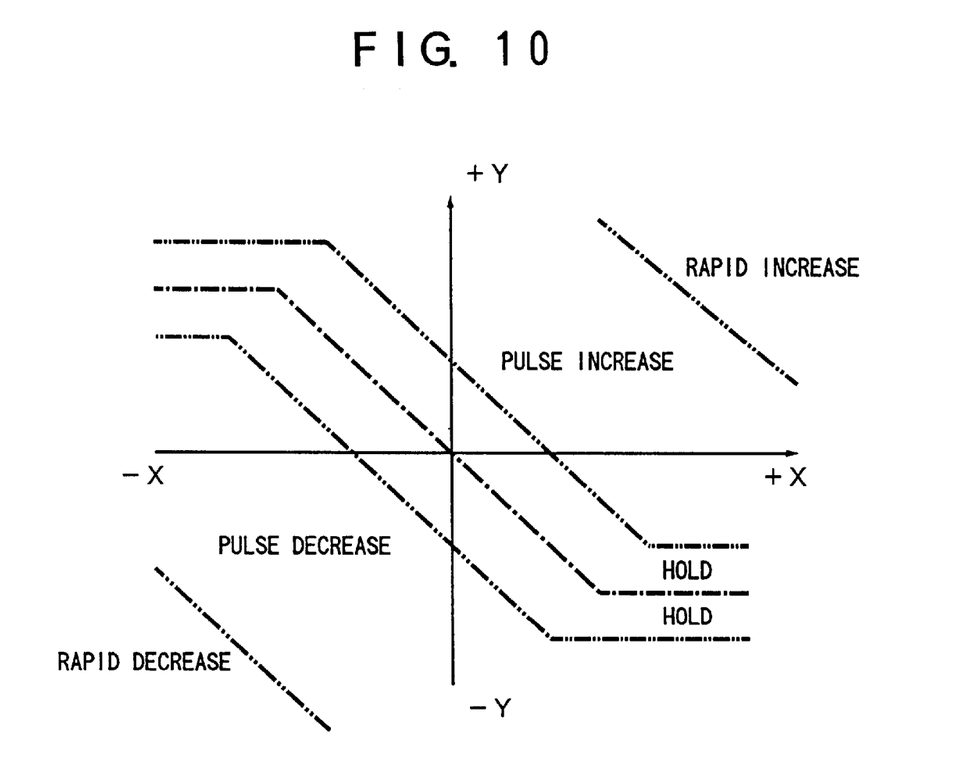
FIG. 10 is a diagram showing a relationship between the pressure control modes and parameters for use in the hydraulic braking pressure control according to an embodiment of the present invention.

Then, the program proceeds to Step 304 where a parameter Y** for providing a hydraulic pressure control in each control mode is calculated in accordance with the following equation:

$$Y^{} = Gs^{} \cdot \Delta St^{**}$$

where "Gs" is a gain, which is provided in response to the vehicle slip angle $\beta$ and in accordance with a diagram as shown by a solid line in FIG. 9. The program further proceeds to Step 305 where another parameter X is calculated in accordance with the following equation:

$$X^{} = Gd^{} \cdot \Delta DVso^{**}$$

where "Gd" is a gain which is a constant value as shown by a broken line in FIG. 9. On the basis of the parameters X and Y, a pressure control mode for each wheel is provided at Step 306, in accordance with a control map as shown in FIG. 10. The control map has a rapid pressure decrease zone, a pulse pressure decrease zone, a pressure hold zone, a pulse pressure increase zone, and a rapid pressure increase zone which are provided in advance as shown in FIG. 10, so that any one of the zones is selected in accordance with the parameters X and Y at Step 306**. In the case where no control mode is performed, no pressure control mode is provided (i.e., solenoids are off).

At Step 307, is performed a pressure increase and decrease compensating control, which is required for smoothing the first transition and last transition of the hydraulic pressure, when the presently selected zone is changed from the previously selected zone at Step 306, e.g., from the pressure increase zone to the pressure decrease zone, or vice versa. When the zone is changed from the rapid pressure decrease zone to the pulse pressure increase zone, for instance, the rapid pressure increase control is performed for a period which is determined on the basis of a period during which the rapid pressure decrease mode, which was provided immediately before the rapid pressure increase control, lasted. Then, the program proceeds to Step 308, where the solenoid PC* of each valve in the hydraulic pressure control apparatus BC is energized or de-energized in accordance with the mode determined by the selected pressure control zone or the pressure increase and decrease compensating control thereby to control the braking force applied to each wheel. Then, the program proceeds to Step 309 where the motor M is driven, and proceeds to Step 310 where the booster changeover valve SB is actuated. That is, the booster changeover valve SB is turned on when the automatic pressurization is performed, as in the traction control, or steering control by braking, or the like.

According to the present embodiment, the steering control by braking is performed irrespective of depression of the brake pedal BP to provide the oversteer restraining control and/or the understeer restraining control. Although the slip rate is used for the control in the present embodiment, any value corresponding to the braking force applied to each wheel, such as the braking pressure in each wheel brake cylinder, may be employed as the desired value for the oversteer restraining control and/or the understeer restraining control.

Figure 6:
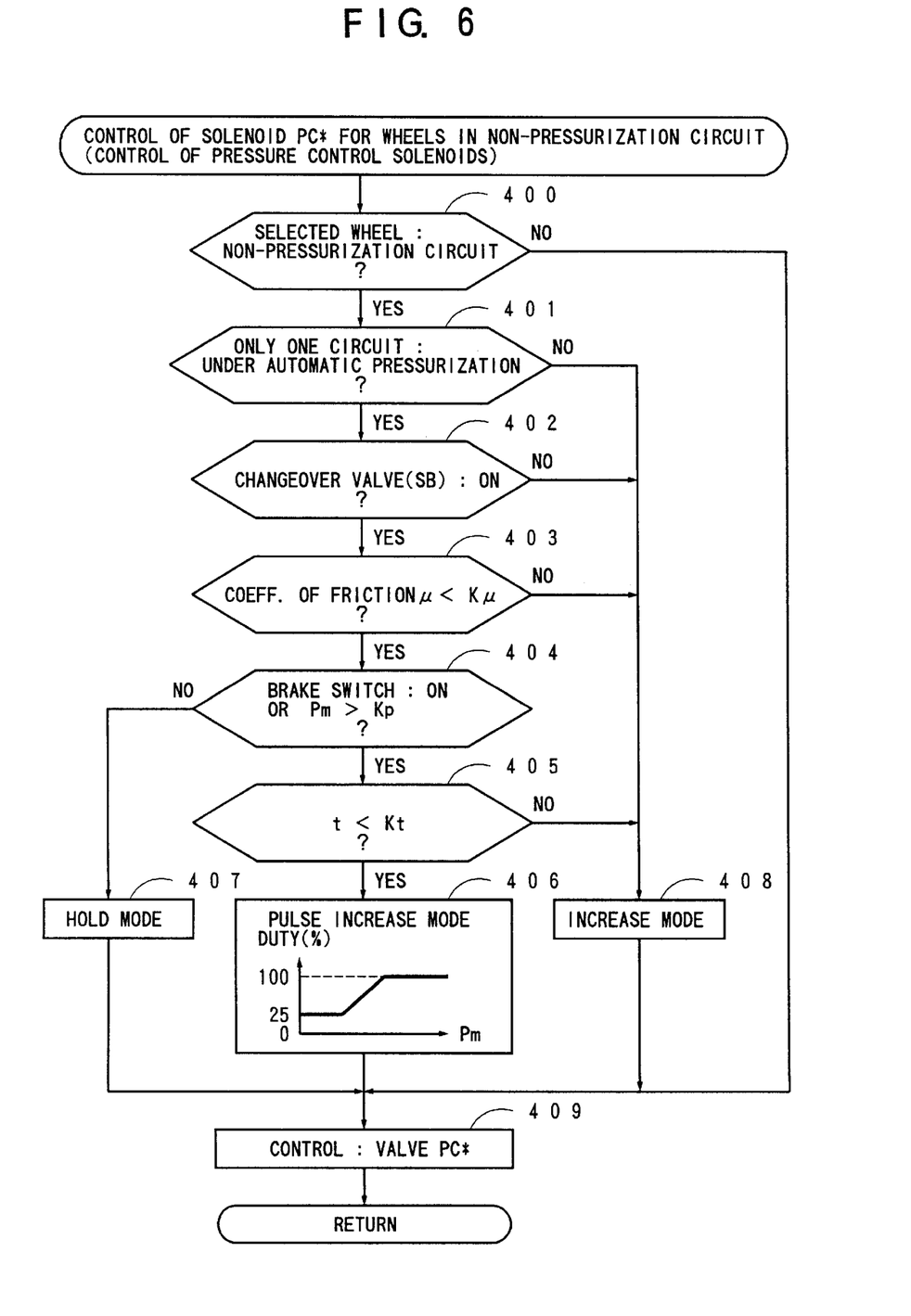
FIG. 6 is a flowchart showing a subroutine for controlling hydraulic pressure control solenoid valves according to an embodiment of the present invention.

Next, the control of the solenoid valve PC* for use in the control of the wheel in the non-pressurization circuit executed at Step 308 in FIG. 5 will be explained with reference to FIG. 6. At the outset, it is determined at Step 400 whether the selected wheel is the one in the non-pressurization circuit, or not. In other words, it is determined whether the anti-skid control or front and rear braking force distribution control is being performed, or not. If neither the anti-skid control nor the front and rear braking force distribution control is being performed, the program proceeds to Step 401. If the anti-skid control or front and rear braking force distribution control is being performed with respect to the selected wheel, the program proceeds to Step 409, where the solenoid valve PC* is controlled in accordance with the pressure mode selected at Step 306 in FIG. 5. At Step 401, it is determined whether an automatic pressurization is being performed or not. The automatic pressurization is to apply the braking pressure to the wheel brake cylinder automatically by the pressurized brake fluid discharged from the pressure pump, in case of the traction control, steering control by braking, or the like. Therefore, the automatic pressurization will not be performed, in case of the anti-skid braking control without the steering control by braking added thereto. In this case, the program proceeds to Step 408, where the normal pressure increase mode is selected. When the automatic pressurization is being performed with respect to the one hydraulic braking pressure circuit, the program proceeds to Step 406 or 407, where the pulse pressure increase mode or hold mode is selected, while the normal pressure increase mode is selected unless a predetermined condition is satisfied.

Then, the program proceeds to Step 402, where it is determined whether the booster changeover valve SB is energized ("on", i.e., the second position), or not. When the booster changeover valve SB is energized ("on"), the auxiliary variable pressure chamber B6 as shown in FIG. 1 is communicated with the atmosphere, so that the auxiliary pressurization by the vacuum booster is performed. In this case, the program proceeds to Step 403 where the coefficient of friction $\mu$ is compared with a predetermined value K$\mu$. If the coefficient of friction $\mu$ is smaller than the predetermined value K$\mu$, the program proceeds to Step 404. If the coefficient of friction $\mu$ is equal to or greater than the predetermined value K$\mu$, i.e., relatively high coefficient of friction, the program proceeds to Step 408 where the normal pressure increase mode is selected. That is, when the vehicle is travelling on a road of relatively low coefficient of friction, a certain countermeasure to the auxiliary pressurization must be taken, but that countermeasure is not taken when the vehicle is travelling on a road of relatively high coefficient of friction. Instead, improvement of feeling in operating the brake pedal BP and reduction of noise are prevailed, in the latter case.

If it determined at Step 404 that the brake pedal BP is depressed, so that the brake switch BS is turned on, or the master cylinder pressure Pm detected by the pressure sensor PS exceeds a predetermined value Kp, then the program proceeds to Step 405, where it is determined whether a time period (t), which lapsed after the brake switch BS was turned on, is less than a predetermined time Kt. If the lapsed time (t) is less than the predetermined time Kt, the program proceeds to Step 406, where the pressure mode for the hydraulic braking pressure circuit including the wheel in the non-pressurization circuit is set to be the pulse pressure increase mode, a duty of which is set to be a value determined in accordance with a graph as shown in Step 406 in FIG. 6, and limited to be within a range of 25%–100%. Consequently, the master cylinder pressure Pm is applied to the wheel brake cylinder in the non-pressurization circuit, in response to depression of the brake pedal BP, so that the brake pedal BP will not be rapidly advanced, but gradually advanced to ensure a smooth operation and appropriate brake feeling.

On the contrary, if it determined at Step 404 that the brake switch BS is turned off, and the master cylinder pressure Pm is equal to or smaller than the predetermined value Kp, then the program proceeds to step 407, where the pressure mode for the other hydraulic braking pressure circuit (i.e., non-pressurization circuit) is set to be the hold mode. Thus, the operation of the brake pedal BP is determined in accordance with the condition of the brake switch BS and the magnitude of the master cylinder pressure, so that a redundant system has been established. In order to determine whether the brake pedal BP is being depressed, it is possible to measure a stroke of the brake pedal BP and determine it on the basis of its magnitude. Or, this determination step may be added to the aforementioned conditions. In the case where the result at any one of Steps 401, 402, 403 and 405 is negative, the program proceeds to Step 408 where the pressure mode for the other hydraulic braking pressure circuit (i.e., non-pressurization circuit) is set to be the normal pressure increase mode. Then, the program proceeds to Step 409 where each solenoid valve PC* is actuated in accordance with the pressure mode selected heretofore.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for a vehicle comprising:
   wheel brake cylinders operatively mounted on front and rear wheels of said vehicle, said wheel brake cylinders being divided into two sets of wheel brake cylinders, each having two wheel brake cylinders;

a master cylinder for pressurizing brake fluid in a reservoir to supply pressurized brake fluid to said wheel brake cylinders in response to depression of a brake pedal;

a first hydraulic braking pressure circuit and a second hydraulic braking pressure circuit for communicating said master cylinder with each of said two sets of wheel brake cylinders, respectively;

two sets of modulator means disposed in said first and second hydraulic braking pressure circuits, respectively, each of said modulating means modulating the braking pressure in each of said wheel brake cylinders;

a pair of hydraulic pressure pumps disposed in said first and second hydraulic braking pressure circuits, respectively, each of said pumps introducing from an inlet thereof the brake fluid and pressurizing the brake fluid to supply the pressurized brake fluid to each of said wheel brake cylinders through each of said modulator means;

two sets of first valve means disposed in said first and second hydraulic braking pressure circuits, respectively, each of said first valve means opening or closing a first passage for communicating said master cylinder with said modulator means, and said first valve means normally opening said first passage;

two sets of second valve means disposed in said first and second hydraulic braking pressure circuits, respectively, each of said second valve means opening or closing a second passage for communicating said reservoir directly with the inlet of each of said pumps, or communicating said reservoir with the inlet of each of said pumps through said master cylinder, and each of said second valve means normally closing said second passage;

auxiliary pressurization means for supplying pressurized brake fluid to each of said first and second hydraulic braking pressure circuits including said second valve means at the inlets of said pumps, respectively, to perform an auxiliary pressurization, at least when said second valve means opened said second passage; and control means for actuating said modulator means, in the case where at least said second valve means in said first hydraulic braking pressure circuit opens said second passage, and said auxiliary pressurization means performs the auxiliary pressurization, to block the communication between said wheel brake cylinders in said second hydraulic braking pressure circuit, when said brake pedal is not depressed, and to communicate said wheel brake cylinders in said second hydraulic braking pressure circuit with said master cylinder, when said brake pedal is depressed.

2. A brake control system as set forth in claim 1, wherein said control means is adapted to actuate said modulator means in said second hydraulic braking pressure circuit to communicate said wheel brake cylinders in said second hydraulic braking pressure circuit with said master cylinder intermittently, when said brake pedal is depressed, in the case where said auxiliary pressurization means performs the auxiliary pressurization.

3. A brake control system as set forth in claim 2, wherein said control means is adapted to set a time period, for which said wheel brake cylinders in said second hydraulic braking pressure circuit are communicated with said master cylinder, in response to an amount operated by said brake pedal.

4. A brake control system as set forth in claim 2, wherein said control means is adapted to actuate said modulator means in said second hydraulic braking pressure circuit to communicate said wheel brake cylinders in said second hydraulic braking pressure circuit with said master cylinder continuously, after a predetermined time lapsed after said brake pedal is depressed.

5. A brake control system as set forth in claim 2, wherein said control means is adapted to actuate said modulator means in said second hydraulic braking pressure circuit to communicate said wheel brake cylinders in said second hydraulic braking pressure circuit with said master cylinder continuously, when said vehicle travels on a road of a coefficient of friction larger than a predetermined value.

6. A brake control system as set forth in claim 1, further comprising a vacuum booster for assisting the operation of said master cylinder, wherein said auxiliary pressurization means is adapted to actuate said vacuum booster at least in part thereof irrespective of the operation of said brake pedal, and supply the pressurized brake fluid from said master cylinder into the inlet of each of said pumps to perform the auxiliary pressurization.

7. A brake control system as set forth in claim 6, wherein said control means is adapted to actuate said modulator means in said second hydraulic braking pressure circuit to communicate said wheel brake cylinders in said second hydraulic braking pressure circuit with said master cylinder intermittently, when said brake pedal is depressed, in the case where said auxiliary pressurization means performs the auxiliary pressurization.

8. A brake control system as set forth in claim 7, wherein said control means is adapted to set a time period, for which said wheel brake cylinders in said second hydraulic braking pressure circuit are communicated with said master cylinder, in response to an amount operated by said brake pedal.

9. A brake control system as set forth in claim 6, wherein said vacuum booster comprises:

a housing;

a movable wall disposed in said housing for defining therein a variable pressure chamber and a constant pressure chamber communicated with a negative pressure source; a valve mechanism operatively mounted on said movable wall, said valve mechanism producing a pressure difference between said variable pressure chamber and said constant pressure chamber in response to depression of said brake pedal; and an auxiliary movable wall disposed in said constant pressure chamber for defining an auxiliary variable pressure chamber between said movable wall and said auxiliary movable wall, said auxiliary movable wall being moved toward said master cylinder in response to depression of said brake pedal, and moved toward said master cylinder in response to the pressure in said auxiliary variable pressure chamber and irrespective of operation of said brake pedal to actuate said master cylinder, and wherein a booster changeover valve is provided for selectively communicating said auxiliary variable pressure chamber with the atmosphere, or communicating with said negative pressure source.

10. A brake control system as set forth in claim 9, wherein said negative pressure source includes an intake manifold of said vehicle.

11. A brake control system as set forth in claim 10, wherein said booster changeover valve is selectively placed in one of a first operating position for communicating said auxiliary variable chamber with said intake manifold where, and a second operating position for communicating said auxiliary variable chamber with the atmosphere.

12. A brake control system as set forth in claim 9, wherein said valve mechanism includes a vacuum valve for communicating said variable pressure chamber with said constant pressure chamber, or blocking the communication therebetween, and an air valve for communicating said variable pressure chamber with the atmosphere, or blocking the communication therebetween, said vacuum valve and said air valve being actuated to produce the pressure difference between said constant pressure chamber and said variable pressure chamber in response to depression of said brake pedal.

* * * * *